(12) United States Patent
Gillard

(10) Patent No.: US 6,295,624 B1
(45) Date of Patent: Sep. 25, 2001

(54) DATA COMPRESSION SYSTEM FOR CONCEALING ERRORS IN COMPRESSED DATA

(75) Inventor: Clive Henry Gillard, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/095,621

(22) Filed: Jun. 10, 1998

(30) Foreign Application Priority Data

Jun. 10, 1997 (GB) .................................................. 9712035

(51) Int. Cl.⁷ .................................................. G06F 11/00
(52) U.S. Cl. .................................................. 714/746
(58) Field of Search ........................... 714/746; 348/398; 386/36; 360/48

(56) References Cited

U.S. PATENT DOCUMENTS

| | | | |
|---|---|---|---|
| 5,047,865 | * 9/1991 | Inoue | 386/36 |
| 5,353,059 | * 10/1994 | Lawlor et al. | 348/398 |
| 5,384,670 | * 1/1995 | Gillard et al. | 360/48 |

FOREIGN PATENT DOCUMENTS

| | | | | |
|---|---|---|---|---|
| 2263373 A | * | 7/1993 | (GB) | H04N/5/93 |
| 2300084 A | * | 10/1996 | (GB) | H04N/7/30 |

* cited by examiner

*Primary Examiner*—Phung M. Chung
(74) *Attorney, Agent, or Firm*—Frommer Lawrence & Haug LLP; William S. Frommer; Gordon Kessler (57) ABSTRACT

A video data compression system uses a wavelet transform circuit (580) but otherwise operates in the manner of an MPEG II compression system. The compressed data is stored on a medium such a tape by e.g. digital video tape recorder (3), which medium and recorder may subject that data to errors by virtue of head failures and/or tape defects. Means (5) are provided to produce concealment data indicative of the form of concealment to be used if data is lost during reproduction. A variety of concealment techniques are used. Some of the transformed data is frequency inverted during transformation. Such data is subject to high pass filtering to conceal errors. Concealment data indicates the most appropriate form of concealment to be used in the event of an error is produced before recording and recorded with the data. The concealment data is recorded on a track different to the track of the data with which it is associated. The concealment data may be produced by trial concealments and/or by providing predetermined concealment data for different forms of data.

18 Claims, 7 Drawing Sheets

| | | | | | | | | |
|---|---|---|---|---|---|---|---|---|
| 0A | 5A | 1A | 5B | | 0B | 5A | 1B | 5B | 0 |
| 4A | 6A | 4B | 6B | | 4A | 6A | 4B | 6B | 4 |
| 2A | 5C | 3A | 5D | | 2B | 5C | 3B | 5D | 2 |
| 4C | 6C | 4D | 6D | | 4C | 6C | 4D | 6D | 4 |

| | | | | | | | | |
|---|---|---|---|---|---|---|---|---|
| 0C | 5A | 1C | 5B | | 0D | 5A | 1D | 5B | 0 |
| 4A | 6A | 4B | 6B | | 4A | 6A | 4B | 6B | 4 |
| 2C | 5C | 3C | 5D | | 2D | 5C | 3D | 5D | 2 |
| 4C | 6C | 4D | 6D | | 4C | 6C | 4D | 6D | 4 |

| 0 | 5 | 1 | 5 | | 0 | 5 | 1 | 5 | 0 |

DATA COMPRESSION SYSTEM FOR CONCEALING ERRORS IN COMPRESSED DATA

BACKGROUND OF THE INVENTION

1. Field of the Invention

The present invention relates to a data compression system and to concealing errors in compressed data. An embodiment of the invention concerns concealing errors in compressed data reproduced from a recording apparatus. In a preferred embodiment the data is transformed by a two dimensional spatial frequency transform such as a wavelet transform. The background to the present invention, and the present invention are described herein, by way of example, with reference to wavelet transformed video data.

2. Description of the Prior Art

Figure 1:
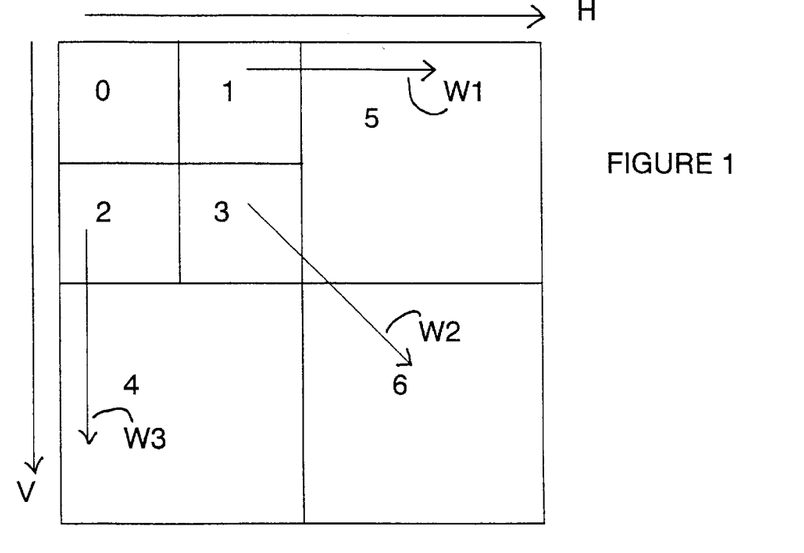
FIG. 1 is a two-dimensional spatial frequency representation of data transformed according to a wavelet transform, and is described hereinbefore.

The wavelet transform is known. Referring to FIG. 1, data subjected to the transform occupies a plurality of two-dimensional spatial frequency bands. In the example of FIG. 1 there are seven bands denoted 0 to 6. There may be other numbers of bands e.g. 9 or more. The wavelet transform transforms the data such that the video data in bands 4, 5 and 6 is sub-sampled horizontally and vertically by ½ and so represent ¼ size images. The video data bands 0, 1, 2 and 3 is sub-sampled horizontally and vertically by ¼ and so represents ¹⁄₁₆ size images. Horizontal spatial frequency increases generally from left to right as indicated by arrow H and vertical spatial frequency increases generally from top to bottom as indicated by arrow V. It is found that typically the most significant image data is in the lowest frequency band 0 and the least significant image data is in the highest frequency band 6.

Video data, as very well known, may be recorded on a medium such as tape. The recording may introduce errors in the data, due to a variety of factors including tape defects and head failure for example. It is known to detect the errors and to conceal them. Concealment is generally done by replacing data in error by some form of average of adjacent data: that is a form of low pass filtering.

The wavelet transform has the property that data in bands 1 to 6 is frequency inverted after transformation. Low pass filtering does not always produce the best replacement value for data errors when applied to wavelet transformed data having frequency inverted data.

SUMMARY OF THE INVENTION

According to one aspect of the invention there is provided a method of concealing errors in data encoded to occupy a plurality of two-dimensional spatial frequency bands, data in at least one band being frequency inverted and data in at least one other band being frequency uninverted, wherein the frequency inverted data is filtered by a high pass spatial filter to conceal errors and the frequency uninverted data is filtered by a low pass spatial filter to conceal errors.

The said one aspect of the invention also provides apparatus for concealing errors in data encoded to occupy a plurality of two-dimensional spatial frequency bands, data in at least one band being frequency inverted and data in at least one other band being frequency uninverted, comprising means for detecting data errors and the spatial frequency band of the data in error, and filter means responsive to the detecting means to high pass filter the frequency inverted data to conceal errors therein and to low pass filter the frequency uninverted data to conceal errors therein.

It is known to conceal video data errors by a variety of concealment techniques. The techniques includes:

a) replacing a data item in error by its nearest neighbouring data item. The neighbouring item may be horizontally, vertically or diagonally adjacent:

b) replacing a data item in error by the weighted sum of neighbours each side of the error as in:
negative diagonal concealment;
positive diagonal concealment;
horizontal concealment;
vertical concealment; and c) temporal concealment using data from an adjacent field or frame.

It has been found that in wavelet transformed data different concealment techniques are appropriate for different spatial frequencies.

According to another aspect of the present invention there is provided a method of processing compressed data in which method the data may be subject to errors, the method including the step of providing, in association with the compressed data, concealment data indicating the form of error concealment to be used to conceal any errors which arise.

The said another aspect of the invention also provides apparatus for compressing data, comprising means for compressing data and means for producing concealment data indicative of the form of error concealment to be used to conceal any data errors which arise in the compressed data, and for associating the concealment data with the compressed data.

Providing the concealment data simplifies and improves the concealment of data errors because the concealment of a data error takes place in the most appropriate manner as determined by the concealment data without the need to determine and compare a plurality of different concealment values as part of the concealment process. In an embodiment of said another aspect of the invention, data indicating a plurality of different forms of concealment is provided in association with respective different items of compressed data.

Referring again to FIG. 1, there are many bands, (e.g. seven bands 0–6) each representing an image. The concealment has to be appropriate to the particular band. Thus for seven bands, with potentially different forms of concealment appropriate to different data items in each band, the amount of concealment data can become considerable and thus a significant overhead on the compressed data stream.

In accordance with a further aspect of the present invention the data is transformed by a two dimensional spatial frequency transform, the data occupying a plurality of different two dimensional spatial frequency bands, different forms of concealment data being provided, bands having like spatial frequency properties being associated with like forms of concealment data.

The further aspect also provides apparatus for compressing data wherein the compressing means transforms the data by a two dimensional spatial frequency transform, the data occupying a plurality of different two dimensional spatial frequency bands, and the concealment data producing means produces different forms of concealment data, bands having like spatial frequency properties being associated with like forms of concealment data.

Preferably the wavelet bands are grouped together into e.g. 4 groups having similar spatial properties. The same concealment data is used for all the bands in a group. This reduces the amount of concealment data which is required to be transmitted.

One of the purposes of providing concealment data is to simplify the process of concealing errors which may be introduced by the process of recording compressed data on a recording medium such as tape due to e.g. tape defects. However if the concealment data is transmitted with the compressed data, it is liable to be subject to errors for the same reasons as errors occur in the compressed data.

According to yet another aspect of the invention, there is provided a method of recording the data in tracks on a recording medium including the step of recording concealment data in tracks different from those of the compressed data with which the concealment data is associated.

The yet another aspect of the invention also provides means for recording the data in tracks on a recording medium wherein the recording means records concealment data in tracks different from those of the compressed data with which the concealment data is associated.

In an embodiment where the data is recorded using a video data recorder in which data is recorded in a plurality of tracks by a plurality of video recording heads, the concealment data is recorded via a different head to the compressed data to which it relates. This reduces the likelihood of simultaneous loss of compressed data and the associated concealment data.

The above, and other objects, features and advantages of this invention will be apparent from the following detailed description of illustrative embodiments which is to be read in connection with the accompanying drawings.

DESCRIPTION OF THE PREFERRED EMBODIMENTS

A Producing Concealment Data, and Recording Concealment Data Separately from Compressed Data.

Figure 4:
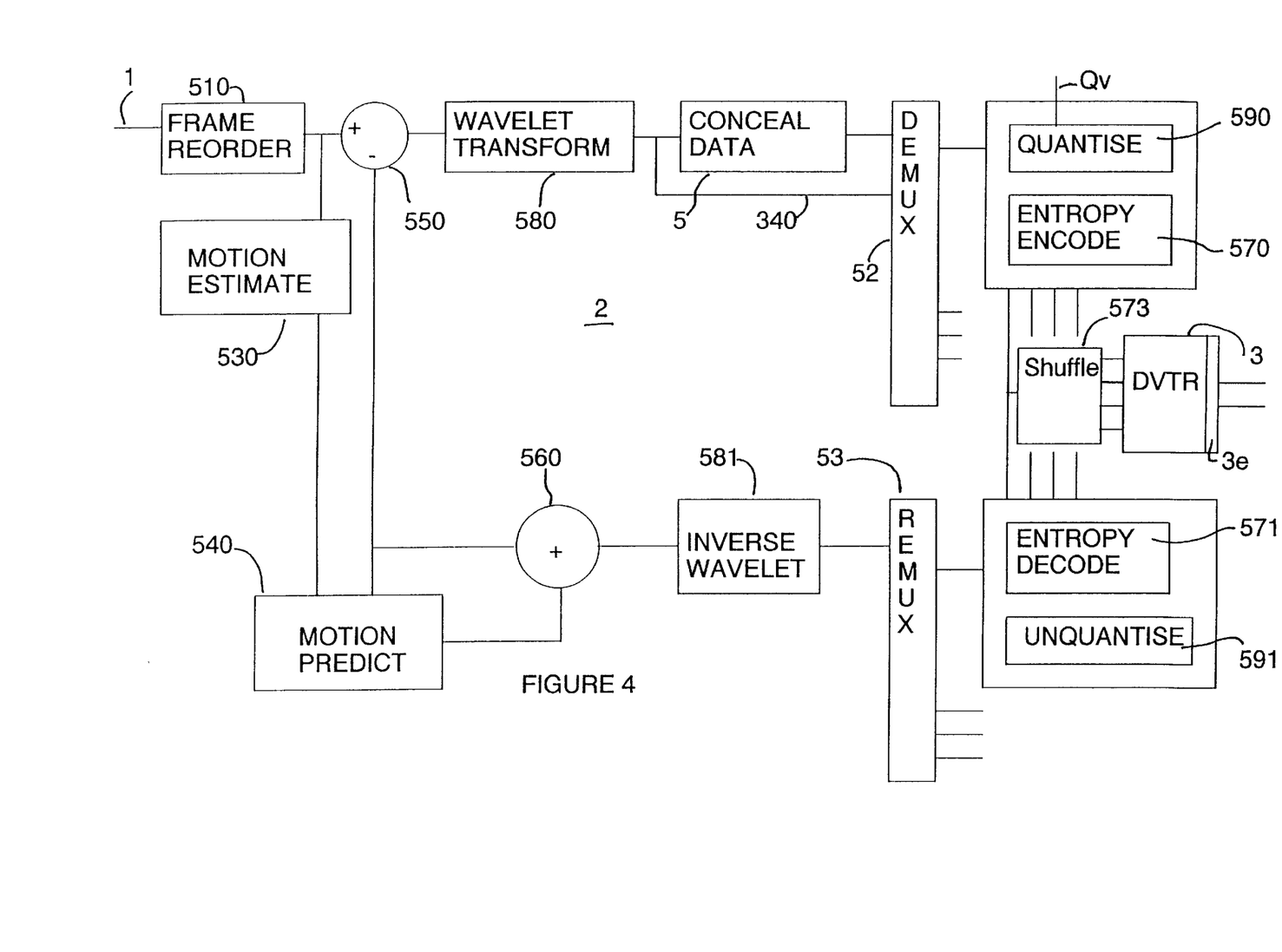
FIG. 4 is a block diagram of a data compressor the compressor including a transform circuit as shown in FIG. 2.

Referring to FIG. 4 digital image data from a source 1 which may include a camera and an analogue to digital converter is compressed in a data compressor 2 in which it is wavelet encoded, and recorded on tape by a digital video tape recorder (DVTR) 3. Compressed data reproduced from the tape recorder 3 is decoded by a decompressor 4 (see FIG. 5) complementary to the compressor 2.

The data recorded on the tape may be subject on reproduction to errors caused by such well known causes as tape defects and head failures.

In accordance with aspects of the present invention and as exemplified hereinafter means 5 (FIG. 4) are provided for producing concealment data for assisting the concealment of errors. The concealment data is used by a concealment circuit 6 (FIG. 5) to conceal data errors. As will be understood by those skilled in the art "conceal" means reduce the visual effects of errors as compared to absence of concealment. Concealment may or may not render the effects of errors invisible. Often if does not render errors invisible at least to those skilled in judging the subjective quality of images.

The means 5 for generating concealment data produces data indicating the appropriate forms of concealment to use if an error arises such as the direction in which to average adjacent samples. The concealment data so generated is associated with the data to which it relates.

The DVTR has for example 4 heads A to D. The concealment data is recorded via a different head e.g. A to the head e.g. D used for recording the compressed data to which it relates. This reduces the likelihood of simultaneous loss of both the compressed data and its associated concealment data.

The digital video recorder 3 records the compressed data and the concealment data using known error correcting techniques which allow the detection of data errors on reproduction. An example of such an error correcting code is the well known Reed-Solomon code. By use of such a code an error detector 3e, known per se, in the video tape recorder indicates data subject to errors by means of error flags $\epsilon$.

Figure 5:
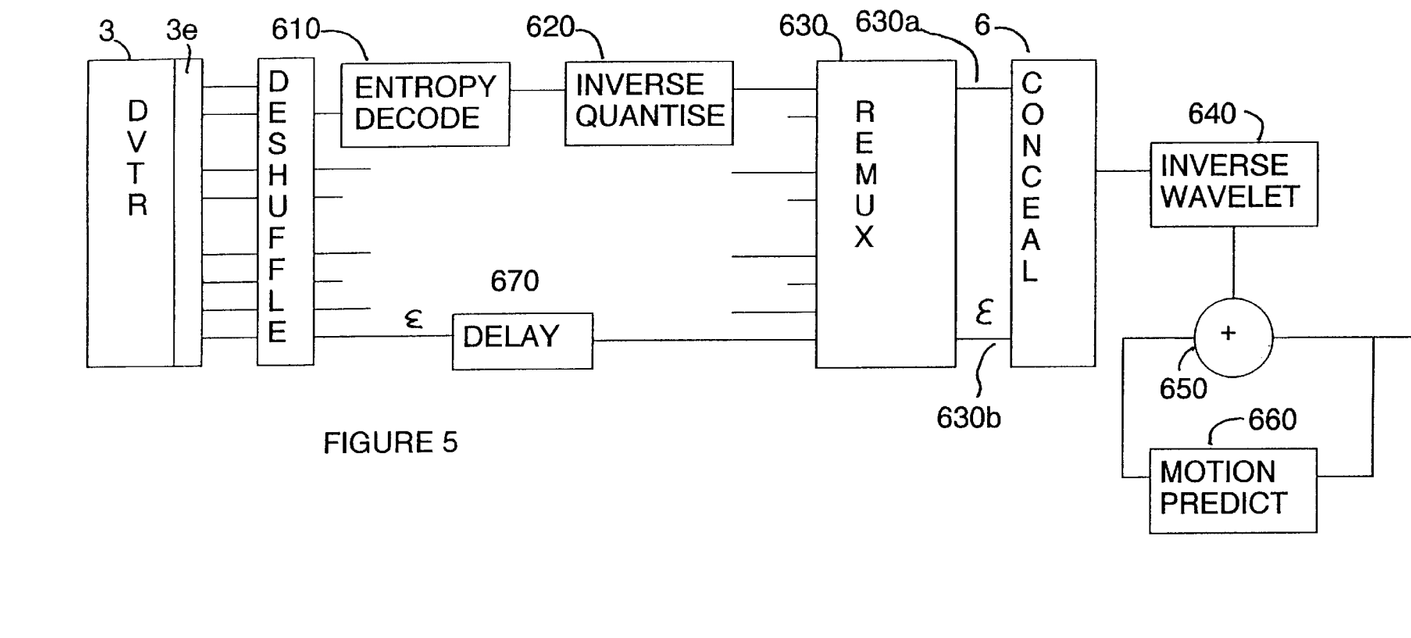
FIG. 5 is a block diagram of the data decompressor.

The error concealment circuit 6 responds to the error flags $\epsilon$ and to the concealment data to conceal data errors. The error concealment takes place in the transform domain before the transformed data is inverse transformed to the time domain.

B Data Compression

B1 Wavelet Transform

Figure 2:
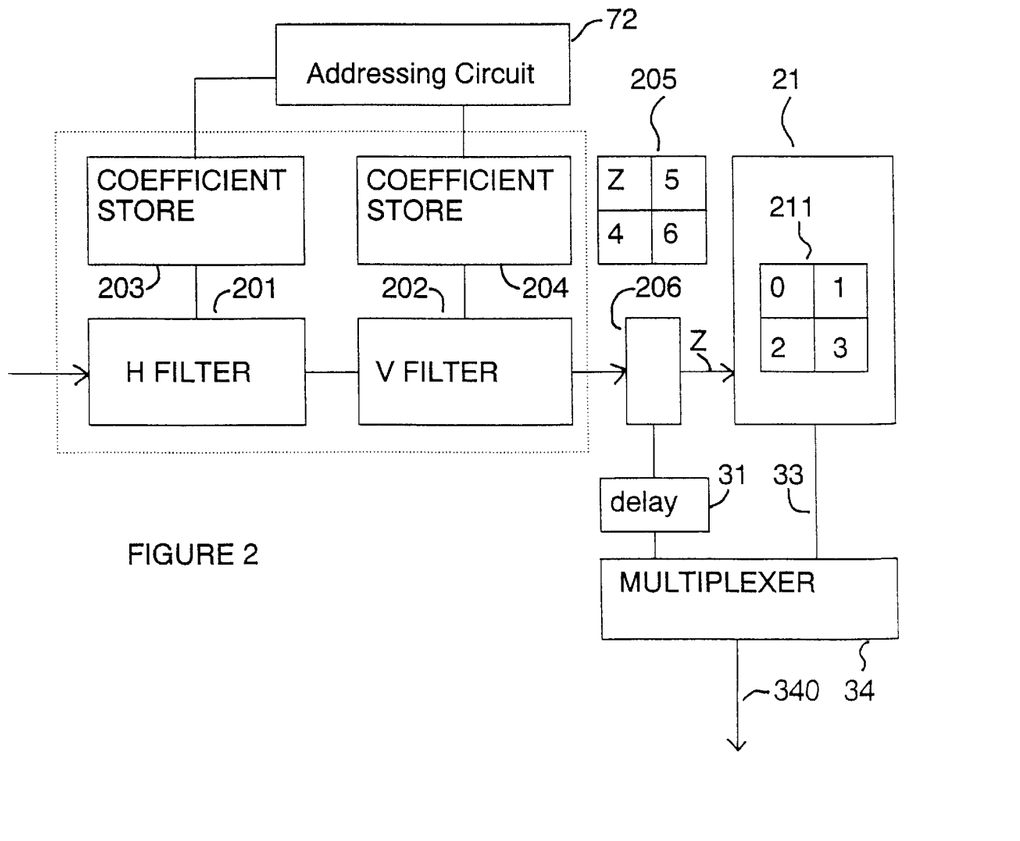
FIG. 2 is a block diagram of a wavelet transform circuit.

Referring to FIG. 2, an illustrative example of a wavelet transform circuit comprises 2 horizontal and vertical filtering stages 20 and 21. Each stage as shown by stage 20 comprises a horizontal transversal filter 201 and a vertical transversal filter 202 which are supplied with coefficients from coefficient stores 203 and 204 respectively. The filters 201, 202 and the coefficient stores 203, 204 operate in known manner to effect the wavelet transform; that transform will not be discussed in detail here. The transform operates to produce transformed samples which fall within the sub-bands 0–7 shown in FIG. 1 and which are subsampled to produce the data structure shown in FIG. 3. To do that seven sets of coefficients corresponding to the respective seven sub-bands 0–6 are applied to base-band data sub-sample by sub-sample. In the stage 20 they are applied in the order Z, 5, Z, 5 . . . 4, 6, 4, 6 . . . Filter stage 20 sub-samples the data horizontally in filter 201 by a factor of 2 and vertically in filter 202 by a factor of 2. Thus the output of stage 20 may be mapped onto the two dimensional spatial frequency map 205.

The stage 20 is followed by a demultiplexer 206 which supplies samples from quadrants 4, 5, 6 to a delay line 31 and samples from quadrant Z to filter stage 21.

In the stage 21, the samples Z from stage 20 are subsampled and subjected to coefficients in the order 0,1, 0, 1, . . . 4, 6, 4, 6 . . . Filter stage 21 sub-samples the samples of quadrant Z by 2 vertically and horizontally. The samples at the output 33 of stage 21 may be mapped onto 2 dimensional map 211.

The coefficient stores 203 and 204 are addressed by an addressing circuit 72 to read-out the coefficients in the appropriate order. The addressing circuit 22 produces data identifying the bands to which the transformed data belongs. The band identification data is used elsewhere in the processor.

The delay line 31 and output 33 feed the samples 0 to 6 to a multiplexer 34.

The multiplexer 34 multiplexes the samples onto a single channel 340. The output of the multiplexer 34 is set out in FIG. 3, which shows the horizontal and vertical order of samples from the seven quadrants 0 to 6 shown in FIG. 1.

B2 Preferred Data Compression System

Referring to FIG. 4, an illustrative example of a data compressor system 2 is shown. The compressor 2 shown in FIG. 4 is constructed and operates in a manner very similar to a data compressor according to systems defined by the MPEG II standard (Motion Picture Experts Group II standard, described in ISO/IEC Publication DIS 1381/1, March 1995), but with a wavelet transform circuit replacing the Discrete Cosine Transform circuit usual in MPEG II compressors.

The compressor of FIG. 4 comprises a frame re-orderer 510, a motion estimator 530, a motion predictor 540, a subtracter 550, an adder 560, a wavelet transform unit 580 (as shown in FIG. 2), a quantiser 590, an entropy encoder 570, an entropy decoder 571, an inverse quantiser 591 and an inverse wavelet coder 581, a demultiplexer 52, a remultiplexer 53 and a circuit 5 for determining concealment direction.

Many features of the apparatus of FIG. 5 operate in a very similar manner to corresponding features of an MPEG encoder. Such features will not be described in detail here.

As is known in MPEG, blocks of transformed data are organised into macroblocks and the macroblocks are assembled into pictures. There are three types of picture, I, B and P. I are intra-encoded: that is the encoding is based only on that picture; P pictures are encoded based on an I picture; and B pictures are encoded based on two adjacent pictures I or P.

Briefly, therefore, the frame reorderer 510 receives input video data and acts on successive groups of pictures (GOP) to reorder the pictures so that each picture within the GOP is compressed after those pictures on which it depends. For example, if a B-picture (bi-directionally predicted picture) depends on a following I- or P-picture, it is reordered to be compressed after that I- or P-picture.

For example, if a GOP comprises the following four initial frames (in the order in which they are displayed), $I_0 B_1 B_2 P_3 \ldots$, where the P-picture uses the I-picture as a reference and the two B- pictures use the surrounding I- and P-pictures as references, then the frame reorderer 510 will reorder the GOP to be compressed in the following order: $I_0 P_3 B_1 B_2 \ldots$ I-pictures are intra-picture encoded, that is to say the encoding is not based on any other reference pictures. An I-picture in a GOP is therefore passed from the frame reorderer 510 to the wavelet transform unit 580, the auto quantiser 590 and the entropy encoder 570 to generate output compressed data representing that I-picture.

The compressed I-picture data is also passed from the entropy encoder 570 through a decompression chain formed by the entropy decoder 571, the inverse quantiser 591, and the inverse wavelet transform unit 581. This reconstructs a version of the I-picture present in the decoder which is passed to the motion predictor 540.

The next picture of the GOP to be compressed, which will generally be a P-picture which depends on the I-picture as a reference, is passed from the frame reorderer 510 to the motion estimator 530 which generates motion vectors indicative of image motion between the I- and P-pictures. The motion predictor 540 then generates a predicted version of the P picture using the motion vectors and the decoded version of the I-picture. This predicted version of the P-picture is subtracted from the actual P-picture by the subtracter 550 and the difference between the 2 frames is passed to the wavelet transform unit 580 for compression. As before, the encoded (compressed) difference data is output by the entropy encoder 570 and is then decoded by the decompression chain 571, 591, 581 to regenerate a version of the difference data.

In the adder 560 the difference data is then added to the previously decompressed version of the I-picture to generate a decompressed version of the P-picture which is then stored in the motion predictor 540 for use in the compression of the next picture.

This process continues, so that each picture which uses other pictures as a reference is in fact compressed by encoding difference data between the input picture and a version of the input picture formed by motion prediction from a previously compressed and then decompressed version of the reference picture. This means that the compression is performed with respect to the pictures which will be available at the decompressor.

Information identifying the type of picture I, B, P and information relating to quantisation levels and motion vectors is conveyed as syntax data in headers associated with e.g. the macro blocks.

The compressed data produced by the compressor of FIG. 4 is applied to the digital video tape recorder 3.

C Concealment Data

To conceal errors, a circuit 5 processes the data from the wavelet transform circuit 580 to determine the direction of concealment as will be discussed in more detail hereinafter.

Figure 3:
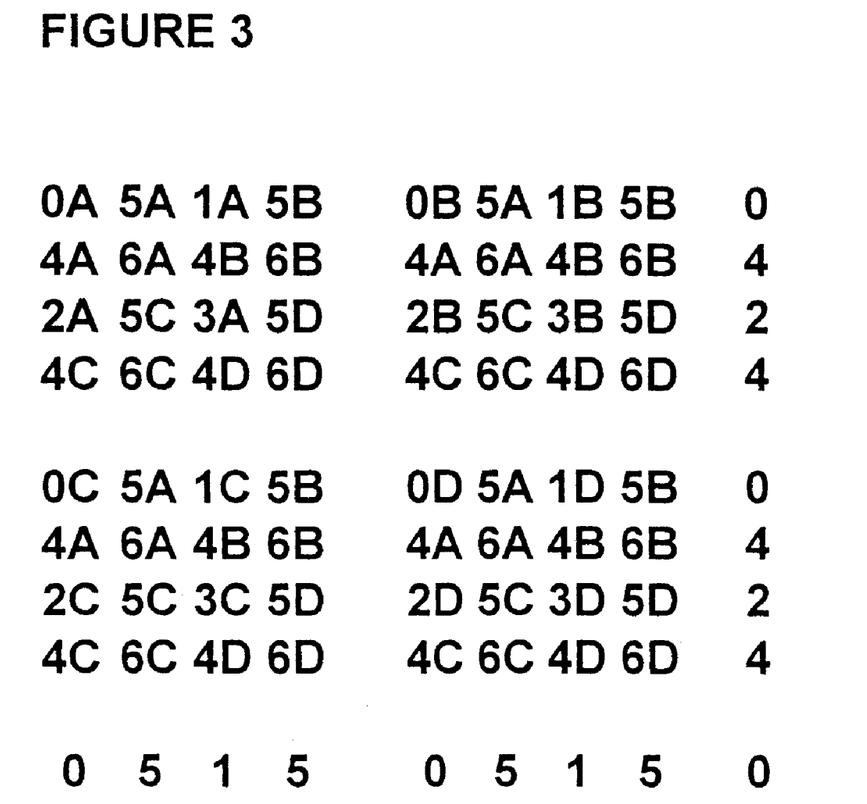
FIG. 3 is a diagram of the structure of data produced by the circuit of FIG. 2

The resulting concealment data and the transformed data is demultiplexed by the demultiplexer 52 onto 4 channels for recording by respective ones of 4 recording heads (A to D) of the DVTR 3. The allocation of the data samples from the bands 0 to 6 to the heads A to D is shown in FIG. 3. (FIG. 3 does not show the allocation of the concealment data.) Each channel comprises a quantiser 590 and an entropy encoder 570; only the quantiser (590) and entropy encoder (570) of one of the channels is shown in FIG. 4. The concealment data is inserted into the bit stream as syntax data as known in MPEG II. [The decompression chain of the compression circuit 2 additionally comprises one entropy decoder 571 an inverse quantiser 591 and a remultiplexer 53 complementary to the demultiplexer 52 and the quantiser 590 and entropy encoder 570 of the compression channel.]

In this way concealment data indicating the most appropriate way to conceal errors in particular types of data are recorded simplifying concealment on reproduction. In addition the concealment data is recorded on a track different to that of its associated data items reducing the likelihood of loss of concealment data.

For this purpose the demultiplexer 52 allocates concealment data to the heads A to D. The concealment data associated with a particular data sample is directed to a head e.g. head A different to the head e.g. head D to which the data sample is directed. This allows data to be restored in the even of the loss of a recording or reply head.

Heads A and B are in one head stack and heads C and D are on another stack. Also heads A and C may share one signal processing channel in the DVTR and heads B and D another. Thus the concealment data may be allocated as follows:

| Data Sample Head | Conceal Data Head |
| --- | --- |
| A | D |
| B | C |
| C | B |
| D | A |

In addition, a shuffle circuit 573 is provided. The recording heads A to D record data in tracks. The demultiplexer 52 protects against loss of a head. The shuffle circuit 573 operates in known manner to allocate data to positions within a track according to a shuffle algorithm. The effect is that image areas which are spatially adjacent in an image are not spatially adjacent on the recording medium. This helps to prevent the loss of spatially adjacent image areas due to, e.g. a longitudinal scratch on a recording tape, which scratch would affect the tracks of all heads A to D.

The shuffled image areas may be MPEG macro blocks which include motion vector data and quantisation data in a header. The header is directed to the same head as the macroblock. The header may be repeated to allow for temporal concealment.

D Concealing Errors and Decompression

Referring to FIG. 5, the data samples and the concealment data are reproduced from the four tracks of the DVTR 3 by respective reproduction heads A to D. The data is applied to respective identical channels of which only one is shown and comprises an entropy decoder 610 and a dequantiser 620. Error flags ϵ are produced by the error detection circuit 3e in the DVTR 3 in known manner. The error flags indicate the location of data errors in each channel. The data from the channels and the error flags are applied to a remultiplexer 630 which reforms the data structure shown in FIG. 4. The error flags ϵ are delayed by delay lines (only one 670 shown) to compensate for the processing delay of the entropy decoders and inverse quantisers. The data and error flags e are applied by the remultiplexer 630 to a concealment circuit 6 which will be described in detail hereinafter. The reproduced data Includes the concealment data. The concealment circuit responds to the error flags on input 630B and concealment data on input 630a to conceal errors in the manner defined by the concealment data.

The data with concealed errors is supplied via an inverse wavelet transform circuit 640 to an adder 650. Referring back to the discussion of the compressor of FIG. 5, as is known in MPEG II decoders if an I-frame is supplied by the inverse transform circuit, it is stored in the motion predictor 660 to form the basis for decompressing subsequent P or B frames. A subsequent P or B frame produced by the inverse transform circuit 640 is added to the I frame in adder 650 to produce a decompressed frame.

E Concealment Techniques

The illustrative concealment circuit 6 of FIG. 5 operates to conceal errors in the following ways:

Bands are grouped 0,W1, W2, W3 as shown in FIG. 1 according to similarity of spatial frequency properties.

TABLE 1

| Group of Bands | Bands in Group | Concealment Technique |
| --- | --- | --- |
| 0 | 0 | 1D, lH or lV or R or T |
| W1 | 1, 5 | 1D, lV or hH or R or T |
| W2 | 3, 6 | 1D, hV or hH or R or T |
| W3 | 2, 4 | 1D, hV or lH or R or T | where 1D indicates one-dimensional filters
l=low pass filters
h=high pass filters
V=vertical
H=horizontal
R=intra-frame replacement i.e. replacement by sample of same band in same frame.
T=temporal replacement i.e. replacement by use of a corresponding data sample from an adjacent frame.

Different concealment techniques are applied to the different bands or groups of bands 0, W1 to W3. Low pass filtering is used for low frequency transform coefficients, and high pass filtering is used for high frequency transform coefficients. Furthermore different forms of concealment are applied within each band or group of bands according to the results of trial concealments performed in the encoder.

F Producing Concealment Data

Referring to FIG. 3, consider the samples shown as a data block. The samples are indicated by a band number (0–6) and a head identification (A to D). Consider data samples from band 0 which corresponds to one of the groups of bands. Consider the sample OD in the centre of the block. To produce concealment data for OD, the value of sample OD is compared with weighted sum of its vertically adjacent band O samples OB, above and O below. The modulus of the vertical difference $|V_D|=|OB-½(OC+O)|$ is found. Similarly, the modulus $|H_D|$ of the horizontal difference $|OD-½(OC+O)|$ is found.

$|H_D|$ is compared with $|V_D|$. If $|H_D|<|V_D|$ then horizontal concealment is indicated. If $|V_D|<|H_D|$ then vertical concealment is indicated.

Similar calculations are performed on samples of other groups of bands. If concealment data is produced for every sample, the amount of concealment data is excessive. Thus, preferably, for all the samples of one group e.g. W1 within the block, the horizontal and vertical differences $H_D$ and $V_D$ are accumulated or integrated over the whole block to establish one piece of concealment data for all samples of that group within the block.

For say group W1 comprising bands 1 and 5, the sum of the vertical differences of the bands 1 and 5 samples over the block is compared with the sum of horizontal differences of the band 1 and 5 samples over the block: i.e. $\Sigma(V_{D5}+V_{D1})-\Sigma(H_{D5}+H_{D1})$ is calculated. If $\Sigma(H_{D5}+H_{D1})$ is greater than $\Sigma(V_{D5}+V_{D1})$ horizontal concealment is indicated. Otherwise vertical concealment is indicated.

Similar calculations are preferred for group W2 (bands 3, 6) and W3 (bands 2, 4) and group O.

Figure 6A:
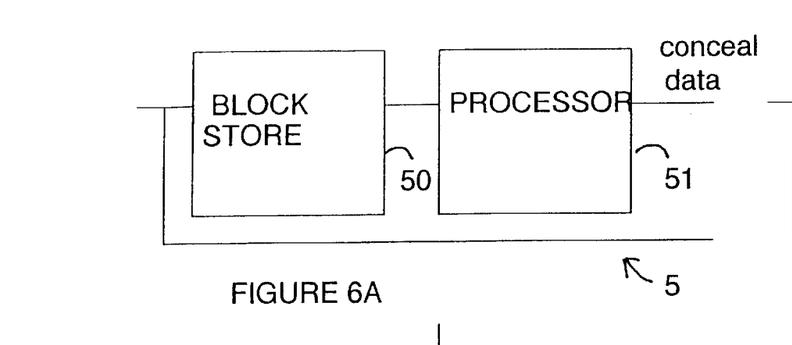
FIGS. 6A and 6B are schematic block diagrams of illustrative circuits for providing concealment data and for concealing errors.

An example of a concealment data processor is shown in FIG. 6.

A store 50 stores successive blocks of data samples as shown in FIG. 3. A processor 51 (i.e. a computer) accesses the samples and performs the arithmetic operations necessary to produce the concealment data as described above. The data samples are produced at video data rates and the store 50 and processor 51 would need to be very fast.

Figure 6B:
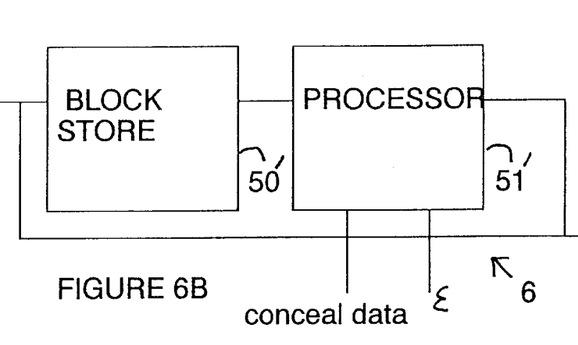

To conceal data errors, a conceal circuit 6 shown in FIG. 6B has the same structure as FIG. 6A. The conceal store 50' stores a data block as shown in FIG. 3, but subject possibly to a data error. The processor responds to the error flag ϵ produced by the DVTR indicating the error and to the concealment data to produce a concealed sample. The concealment data indicates which of the concealment processes is to be performed to conceal the error.

Figure 7:
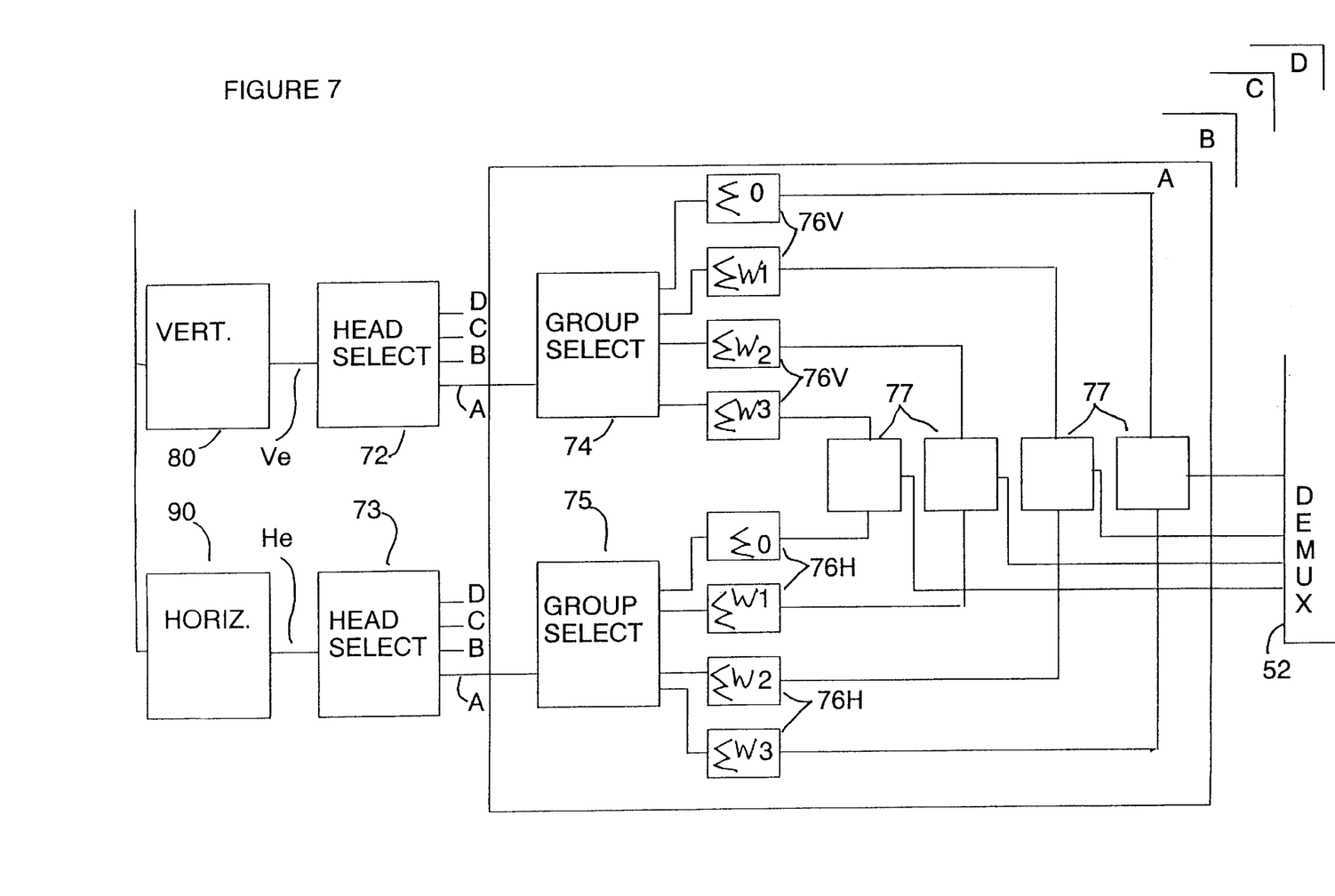
FIG. 7 is a block diagram of an alternative embodiment of a circuit for producing concealment data.

Referring to FIG. 7, an alternative, currently preferred concealment data processor 5 is shown. The processes performed to conceal errors are as set out in Table 1.

The processor of FIG. 7 differs from that of FIG. 6A in that it provides individual concealment data for each recording head A to D. This reduces the processing data rates, and may allow more accurate concealment because the concealment data is determined using fewer data samples.

Referring to FIG. 7, a vertical error detection circuit 80 (shown in FIG. 8) operates on all samples sequentially to determine the difference Ve between a current sample and the weighted sum of vertically adjacent samples. Similarly a horizontal error detection circuit 90 (shown in FIG. 9) operates on all samples sequentially to determine the difference He between a current sample and the weighted sum of horizontally adjacent samples.

Ve and He for each sample are fed to head selection circuit 72, 73 or demultiplexer (similar to demultiplexer 52). Referring to FIG. 3, the values of Ve and He for each data sample shown in FIG. 3 are allocated to head channels A to D as indicated in FIG. 3.

Four such channels A, B, C and D are provided in parallel as indicated in FIG. 7 but only one channel A is shown in detail.

In channel A the Ve and He are fed to respective Group Selection circuits 74, 75 which allocate the Ve and He to respective group accumulators 76vo, 76vw1–76vw3, 76ho, 76hw1–76hw3.

Each accumulator 76 sums all the values Ve or He of the errors fed to it for one block. The corresponding values of $\Sigma Ve$ and $\Sigma He$ are compared in comparators 77 which produce 1 bit decisions 1 or 0 where for example 1 indicates $\Sigma Ve$ has the lower value indicating vertical concealment and 0 indicates horizontal concealment.

The 1 bit decisions constitute the concealment data for the groups of bands 0, W1–W3 and are supplied to the demultiplexer 52 for allocation to a recording head different to the head of the associated data samples.

The vertical and horizontal error detection circuits will now be described with reference to FIGS. 3 and 8 and 9.

Consider the sample OD in the centre of FIG. 3. If it is in error it would be replaced by a weighted sum of its horizontally or vertically adjacent band O samples. They are spaced by 4 periods horizontally and vertically. Similarly adjacent band 1, 2 and 3 samples are spaced by 4 periods horizontally and vertically.

Band 4, 5 and 6 samples are spaced by 2 periods vertically and horizontally.

Thus the vertical error detection circuit 80 comprises 4 delay lines 81 each of 2 vertical (2V) periods. The sample of interest is at the centre of the delay lines 81. For band 4, 5, 6 samples the sample of interest is subtracted from the weighted sum 82 of samples spaced therefrom by 2V. For bands 0, 1, 2 and 3 the sample of interest is subtracted from the weighted sum 85 of samples spaced therefrom by 4V. A switch 83 actuated by the band identification data selects the appropriate weighted sum. A subtracter 84 produces the desired error Ve.

Figure 8:
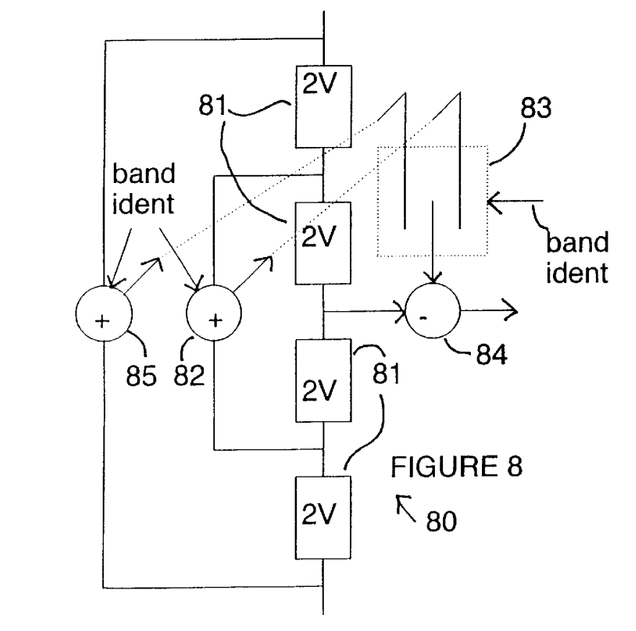
FIG. 8 is a block diagram of a circuit for producing vertical concealment data.
Figure 9:
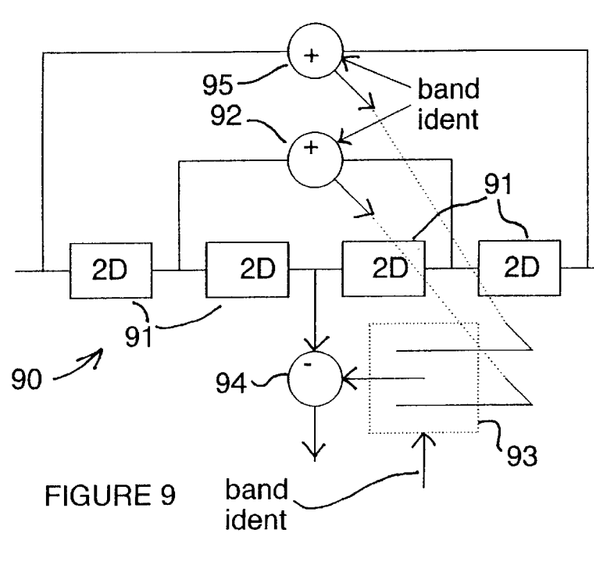
FIG. 9 is a block diagram of a circuit for producing horizontal concealment data.

The structure of the error detector of FIG. 9 corresponds to that of FIG. 8 and comprises circuits 91 to 95 corresponding to circuits 81 to 85. The horizontal error detector of FIG. 9 operates in exactly the same way as the detector of FIG. 8. The only difference is that the delays 9 delay by 2 horizontal delay periods 2D instead of 2V.

Referring to Table 1 above, some coefficients are subject to low pass filtering, as shown in the Table. The summers 82, 85, 92, 95 shown in FIGS. 8 and 9 act as adders on coefficients subject to low pass filtering and substracters on coefficients subject to high pass filtering.

For that purpose the summers 82, 85, 92, 95 have band ident inputs for receiving signals indicating the band in which the coefficient occurs to control whether the summer is an adder or subtracter. The band ident signals are determined directly from the coefficients the positions of which are always fixed.

Figure 10:
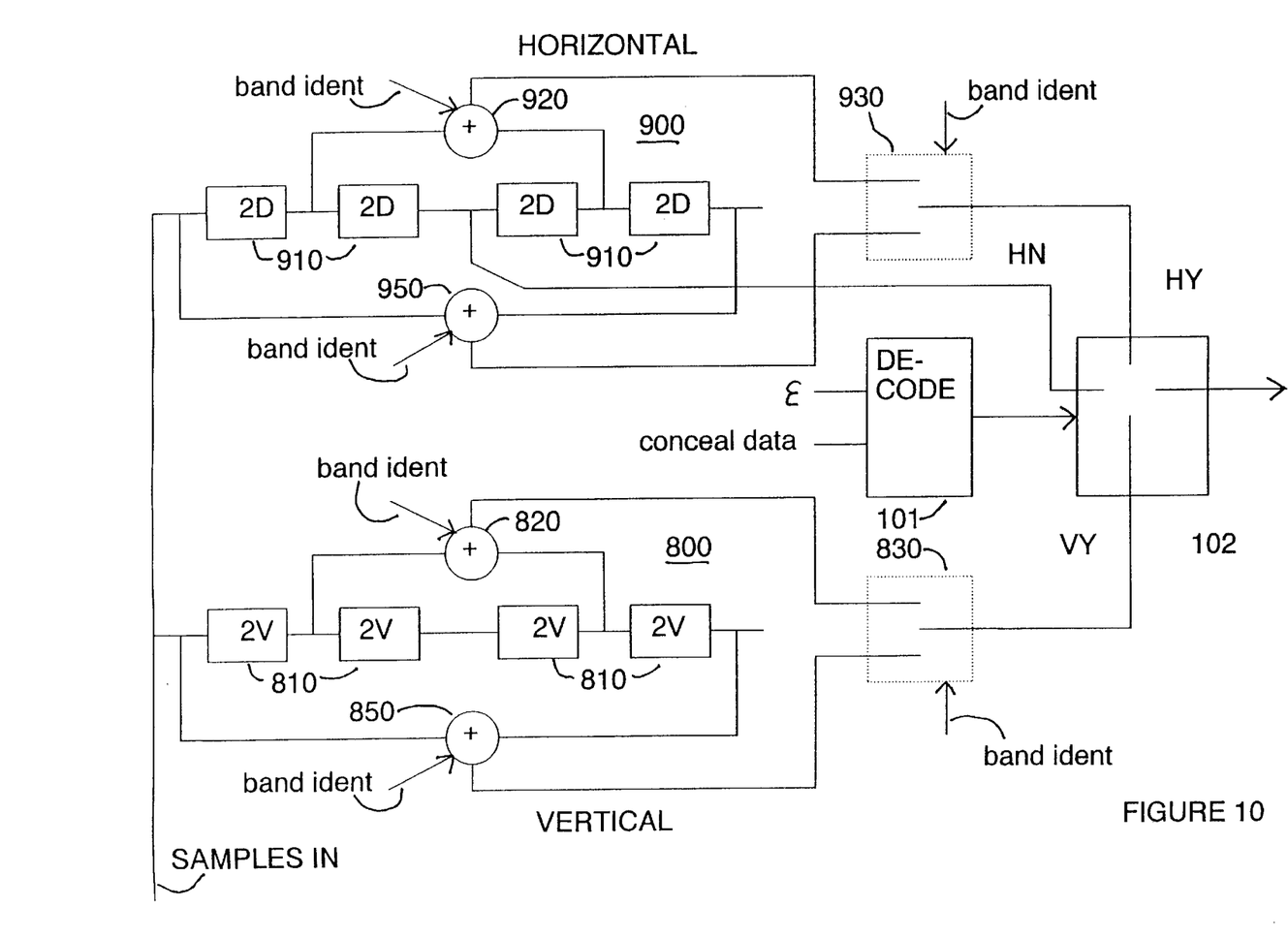
FIG. 10 is a block diagram of an error concealment circuit.

Referring to FIG. 10, an example of the concealment circuit 6 of FIG. 5 is shown. It comprises a vertical conceal circuit 800 corresponding to circuit 80, a horizontal conceal circuit 900 corresponding to circuit 90 a decoder 101 which decodes the error flags $\epsilon$ and the conceal data to select the appropriate one of the circuits 800, 900 and a selector 102 responsive to the decoder. Circuits 800 and 900 operate exactly as circuits 80 and 90.

All reproduced samples are supplied to and processed by the circuits 800 and 900. If there are no data errors (flag $\epsilon=0$) the samples are output, delayed but unchanged from the centre of for example the horizontal delay line 910 of circuit 900.

If there is a data error (flag $\epsilon=1$) the conceal data indicates whether vertical (1) or horizontal (0) concealment is required.

The band select circuit 830, 930 in each circuit 800, 900 selects the weighted sum (820, 850; 920, 950) appropriate to the band of the sample of interest.

The selector switch 102 is a three position switch responsive to the decoder 101, according to:

TABLE 2

|  | Switch Position | Error flag | Conceal |
| --- | --- | --- | --- |
| No error | HN | 0 | 0 |
| Vertical Conceal | VY | 1 | 1 |
| Horizontal conceal | HY | 1 | 0 |

If there is a single sample error it is assumed that two adjacent samples are available to conceal the error. If one of the adjacent samples is itself in error, the conceal circuit 800 or 900 automatically defaults to replacement by the single available adjacent sample subject to some weighting.

In another version of the system (not shown) if no adjacent samples are available in a block, then the sample in error is replaced by the corresponding sample in an adjacent frame: i.e. temporal replacement.

Instead of using ID filters, 2D filters could be used as follows:

TABLE 3

| Group | Concealment | Technique |
| --- | --- | --- |
| 0 | 2D | lH/lv |
| 1, 5 | 2D | lV/lH |
| 3, 6 | 2D | hV/hH |
| 2, 4 | 2D | hV/lH | where 2D indicates 2-dimensional filtering.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of processing compressed data subject to errors, comprising the steps of:
   providing in association with the compressed data concealment data indicating a form of error concealment to be used to conceal any errors which arise; and
   processing said compressed data in accordance with said concealment data.

2. A method according to claim 1, wherein data indicating a plurality of different forms of concealment is provided in association with respective different items of compressed data.

3. A method according to claim 1, wherein the data is transformed by a two dimensional spatial frequency transform, the data occupying a plurality of different two dimensional spatial frequency bands, different forms of concealment data being provided, bands having like spatial frequency properties being associated with like forms of concealment data.

4. A method according to claim 1, comprising the step of performing trial concealments on the compressed data and providing the concealment data in dependence upon the trial concealments.

5. A method according to claim 1 further comprising recording the data in tracks on a recording medium.

6. A method according to claim 5 further comprising the step of recording the concealment data in tracks different from those of the compressed data with which the concealment data is associated.

7. A method according to claim 1 further comprising reproducing the data, detecting errors, and concealing the errors in accordance with the concealment data.

8. A method according to claim 7 wherein the step of recording incorporates the application of an error-correcting coding to the data and the step of reproducing incorporates the production of error flags denoting data in error, error concealment taking place in response to the error flags.

9. A method according to claim 7 comprising the step of inverse transforming the data after concealment of the errors.

10. Apparatus for compressing data, comprising:

means for compressing data; and means for producing concealment data prior to recording of said compressed data indicative of a form of error concealment to be used to conceal any data errors which arise in the compressed data, and for associating the concealment data with the compressed data.

11. Apparatus according to claim 10 wherein the concealment data producing means produces data indicating a plurality of different forms of concealment in association with respective different items of compressed data.

12. Apparatus according to claim 10, wherein the compressing means transforms the data by a two dimensional spatial frequency transform, the data occupying a plurality of different two dimensional spatial frequency bands, and the concealment data producing means produces different forms of concealment data, bands having like spatial frequency properties being associated with like forms of concealment data.

13. Apparatus according to claim 10, further comprising means for performing trial concealments on the compressed data and providing the concealment data in dependence upon the trial concealments.

14. Apparatus according to claim 10, further comprising means for recording the data in tracks on a recording medium.

15. Apparatus according to claim 14 wherein the recording means records the concealment data in tracks different from those of the compressed data with which the concealment data is associated.

16. Apparatus according to claim 10 further comprising reproducing the data, means for detecting errors, and means for concealing the errors in accordance with the concealment data.

17. Apparatus according to claim 16 further comprising means for encoding the data according to an error-correcting code prior to recording, and means for producing error flags upon reproduction indicative of data errors, the concealing means being responsive to the error flags to conceal errors.

18. Apparatus according to claim 16 further comprising data decompressing means arranged to decompress data received from the concealing means.

* * * * *